US012713415B2

(12) United States Patent
Tamrakar et al.

(10) Patent No.: US 12,713,415 B2
(45) Date of Patent: Aug. 18, 2026

(54) COMMUNICATION RESOURCE ACTIVATION METHOD, TERMINAL, AND NETWORK SIDE DEVICE

(71) Applicant: VIVO MOBILE COMMUNICATION CO., LTD., Dongguan (CN)

(72) Inventors: Rakesh Tamrakar, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 472 days.

(21) Appl. No.: 18/191,970

(22) Filed: Mar. 29, 2023

(65) Prior Publication Data

US 2023/0232388 A1 Jul. 20, 2023

Related U.S. Application Data

(63) Continuation of application No. PCT/CN2021/120825, filed on Sep. 27, 2021.

(30) Foreign Application Priority Data

Sep. 29, 2020 (CN) ........................ 202011055108.2

(51) Int. Cl.
*H04W 72/0457* (2023.01)
*H04L 5/00* (2006.01)
*H04W 72/044* (2023.01)
*H04W 72/0453* (2023.01)
*H04W 72/23* (2023.01)

(52) U.S. Cl.
CPC ....... *H04W 72/0457* (2023.01); *H04L 5/0051* (2013.01); *H04W 72/23* (2023.01)

(58) Field of Classification Search
CPC ............. H04W 72/0457; H04W 72/23; H04W 72/0453; H04W 72/046; H04L 5/0051; H04L 5/0023; H04L 5/001; H04L 5/0098
USPC ........................................................ 370/329
See application file for complete search history.

(56) References Cited

U.S. PATENT DOCUMENTS 11,218,898 B2 1/2022 Takeda et al.
11,240,809 B2 2/2022 Tsai et al.
11,489,651 B2 11/2022 Wu
(Continued)

FOREIGN PATENT DOCUMENTS

CN 109391316 A 2/2019
CN 109788564 A 5/2019
(Continued)

OTHER PUBLICATIONS

First Office Action for Japanese Patent Application No. 2023-519713, dated Jan. 18, 2024.
Extended European Search Report for European Patent Application No. 21874412.6, dated Feb. 16, 2024.
ZTE Corporation, "Discussion on Low Latency SCell Activation", Document R1-1904156, 3GPP TSG RAN WG1 Meeting #96bis, Apr. 8-12, 2019.
(Continued)

*Primary Examiner* — Xuan Lu
(74) *Attorney, Agent, or Firm* — Harness, Dickey & Pierce, P.L.C.

(57) ABSTRACT

A communication resource activation method includes: activating, by a network side device, a target communication resource of a terminal, and performing uplink beam scanning on the target communication resource while activating the target communication resource, where the target communication resource includes: a secondary cell or a BWP in a dormant state.

13 Claims, 5 Drawing Sheets

200

S210

A network side device activates a target communication resource of a terminal

S212

The network side device performs uplink beam scanning on the target communication resource while activating the target communication resource

(56) References Cited

U.S. PATENT DOCUMENTS

| | | | | |
|---|---|---|---|---|
| 2011/0268087 | A1* | 11/2011 | Kwon | H04L 5/0005 370/328 |
| 2019/0090227 | A1* | 3/2019 | Tsai | H04W 72/046 |
| 2019/0150161 | A1 | 5/2019 | Cheng et al. | |
| 2020/0106647 | A1 | 4/2020 | Chen et al. | |
| 2020/0213069 | A1 | 7/2020 | Jiang et al. | |
| 2020/0221323 | A1 | 7/2020 | Xu et al. | |
| 2022/0174601 | A1* | 6/2022 | Chen | H04W 72/23 |
| 2022/0353698 | A1* | 11/2022 | Jang | H04L 1/189 |
| 2022/0369242 | A1* | 11/2022 | Matsumura | H04W 52/242 |
| 2023/0074423 | A1* | 3/2023 | Matsumura | H04L 5/006 |
| 2023/0122848 | A1* | 4/2023 | Kim | H04L 5/001 455/522 |
| 2023/0247501 | A1* | 8/2023 | Kim | H04W 74/0833 370/331 |
| 2023/0275728 | A1* | 8/2023 | Chung | H04W 52/42 370/329 |

FOREIGN PATENT DOCUMENTS

| | | | |
|---|---|---|---|
| CN | 111492686 | A | 8/2020 |
| WO | WO-2020005144 | A1 | 1/2020 |

OTHER PUBLICATIONS

Second Office Action regarding Japanese Patent Application No. 2023-519713, dated Jun. 12, 2024.

CATT, "Remaining Issues on UL SRS and UL Procedures for NR Positioning", Document R1-2005682, 3GPP TSG RAN WG1 Meeting #102, Aug. 17-28, 2020.

International Search Report and Written Opinion of the International Searching Authority regarding International Patent Application No. PCT/CN2021/120825, dated Nov. 17, 2021. Translation provided by Bohui Intellectual Property.

* cited by examiner

COMMUNICATION RESOURCE ACTIVATION METHOD, TERMINAL, AND NETWORK SIDE DEVICE

CROSS-REFERENCE TO RELATED APPLICATIONS

The application is a Bypass Continuation Application of International Application No. PCT/CN2021/120825, filed on Sep. 27, 2021, which claims priority to Chinese Patent Application No. 202011055108.2, filed on Sep. 29, 2020, which are incorporated herein by reference in their entirety.

TECHNICAL FIELD

This application belongs to the field of wireless communications technologies, and specifically, to a communication resource activation method, a terminal, and a network side device.

BACKGROUND

In the related art, a network side device can activate a secondary cell of a terminal (which may also be referred to as a terminal device or user equipment (UE)), and can communicate on the secondary cell after a specified time, including triggering the UE to send a sounding reference signal (SRS). For example, the network side device can respectively activate a secondary cell 1 to a secondary cell 7 through C1 to C7 bits in medium access control (MAC) control element (CE) signaling. If a certain bit is 1, it means that a secondary cell corresponding thereto is activated.

In addition, when a bandwidth part (BWP) of the UE is in a dormant state, the network side device can also activate the BWP and communicate on the BWP after a specified time, including triggering the UE to send the SRS. For example, the network side device can activate the BWP in the dormant state through a downlink control information (DCI) command.

Therefore, in the related art, it takes a certain time for the network side device to communicate on the secondary cell or BWP after activating the secondary cell or BWP, so it takes a long time to complete uplink and downlink beam scanning on the BWP activated by the secondary cell, that is, it takes a long time for the secondary cell or BWP to communicate normally after being activated.

SUMMARY

According to a first aspect, a communication resource activation method is provided. The method includes: activating, by a network side device, a target communication resource of a terminal, and performing uplink beam scanning on the target communication resource while activating the target communication resource, where the target communication resource includes: a secondary cell or a bandwidth part BWP in a dormant state.

According to a second aspect, an SRS sending method is provided. The method includes: receiving, by a terminal, target communication resource activation signaling; and sending, by the terminal, a target SRS on a target communication resource while the terminal completes activation of the target communication resource indicated by the target communication resource activation signaling, where the target communication resource includes a secondary cell or a BWP in a dormant state of the terminal.

According to a third aspect, a communication resource activation apparatus is provided. The apparatus includes: an activation module, configured to activate a target communication resource of a terminal, where the target communication resource includes: a secondary cell or a BWP in a dormant state; and a scanning module, configured to perform uplink beam scanning on the target communication resource while the activation module activates the target communication resource.

According to a fourth aspect, an SRS sending apparatus is provided. The apparatus includes: a receiving module, configured to receive target communication resource activation signaling; an activation module, configured to activate a target communication resource indicated by the target communication resource activation signaling based on the target communication resource activation signaling; and a sending module, configured to send a target SRS on the target communication resource while the activation module completes activation of the target communication resource, where the target communication resource includes a secondary cell or a BWP in a dormant state of the terminal.

According to a fifth aspect, a network side device is provided, the network side device including a processor, a memory, and a program or an instruction stored in the memory and executable by the processor, the program or the instruction, when executed by the processor, implementing steps of the method according to the first aspect.

According to a sixth aspect, a terminal is provided, the terminal including a processor, a memory, and a program or an instruction stored in the memory and executable by the processor, the program or the instruction, when executed by the processor, implementing steps of the method according to the second aspect.

According to a seventh aspect, a non-transitory readable storage medium is provided, storing a program or an instruction, the program or the instruction, when executed by a processor, implementing steps of the method according to the first aspect, or steps of the method according to the second aspect.

According to an eighth aspect, a chip is provided, including a processor and a communication interface, the communication interface being coupled to the processor, and the processor being configured to run a program or an instruction of a network side device to implement the method according to the first aspect, or the processor being configured to run a program or an instruction of a terminal to implement the method according to the second aspect.

According to a ninth aspect, a computer program product is provided, the computer program product including a processor, a memory, and a program or an instruction stored in the memory and executable by the processor, the program or the instruction, when executed by the processor, implementing steps of the method according to the first aspect, or steps of the method according to the second aspect.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

The terms such as "first" and "second" in the specification and the claims of this application are intended to distinguish between similar objects, but are not used for describing a specific sequence or a chronological order. It is to be understood that the data used in such a way is interchangeable in proper circumstances, so that the embodiments of this application can be implemented in other sequences than the sequence illustrated or described herein. In addition, objects distinguished by "first" and "second" are usually of one type, and a quantity of the objects is not limited. For example, a first object may be one or more than one. In addition, "and/or" in the specification and claims represents at least one of connected objects. The character "I" generally indicates an "or" relationship between the associated objects.

It is worth noting that technologies described in the embodiments of this application are not limited to a long term evolution (LTE)/LTE-advanced (LTE-A) system, but may further be used in other wireless communication systems, such as code division multiple access (CDMA), time division multiple access TDMA), frequency division multiple access (FDMA), orthogonal frequency division multiple access (OFDMA), single-carrier frequency-division multiple access (SC-FMA), and other systems. The terms "system" and "network" in the embodiments of this application are often used interchangeably, and the described technologies may be used for not only the foregoing systems and radio technologies, but also other systems and radio technologies. However, the following description describes a new radio (NR) system for a purpose of example, and an NR term is used in many parts of the following description. These technologies are also applicable to an application other than an NR system application, such as a $6^{th}$ generation (6G) communication system.

Figure 1:
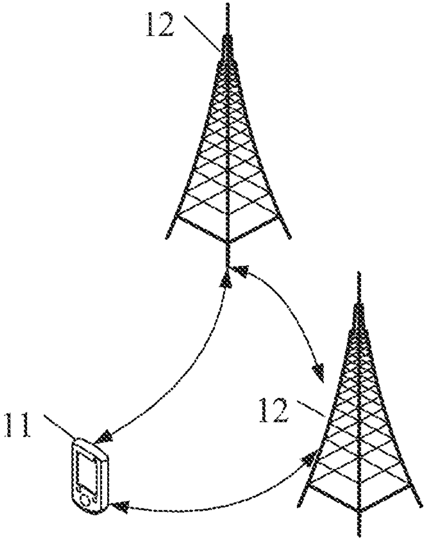
FIG. 1 is a block diagram of a wireless communication system to which an embodiment of this application is applicable.

FIG. 1 is a block diagram of a wireless communication system to which an embodiment of this application is applicable. The wireless communication system includes a terminal 11 and a network side device 12. The terminal 11 may also be referred to as a terminal device or UE. The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), pedestrian user equipment (PUE), and the like. The wearable device includes: a bracelet, a headphone, glasses, and the like. It needs to be noted that, the embodiments of this application do not limit a specific type of the terminal 11. The network side device 12 may be a base station or a core network. The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a WLAN access point, a WiFi node, a transmitting receiving point (TRP), or some another suitable term in the described art. As long as the same technical effect is achieved, the base station is not limited to a specific technical term. It needs to be noted that, in the embodiments of this application, only a base station in the NR system is used as an example, but a specific type of the base station is not limited.

The following describes the communication resource activation method provided in the embodiments of this application in detail through some embodiments and application scenarios thereof with reference to the accompanying drawings.

Figure 2:
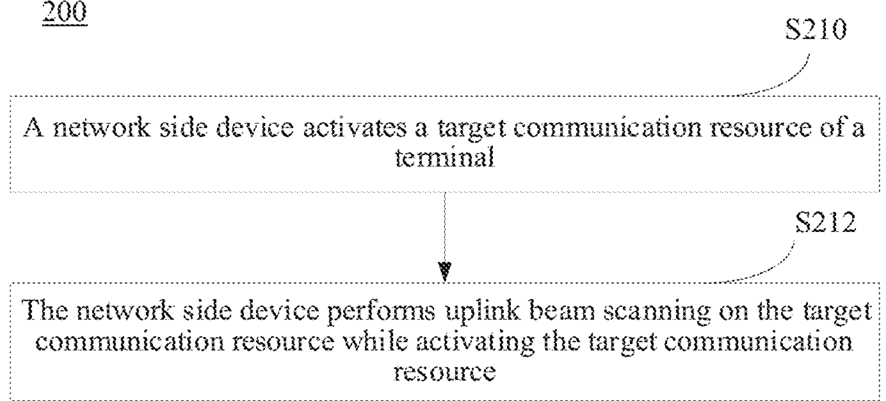
FIG. 2 is a flowchart of a communication resource activation method according to an embodiment of this application.

FIG. 2 is a schematic flowchart of a communication resource activation method according to an embodiment of this application. The method 200 may be performed by a network side device. In other words, the method may be performed by software or hardware installed on the network side device. As shown in FIG. 2, the method may include the following steps.

S210. A network side device activates a target communication resource of a terminal, where the target communication resource includes: a secondary cell or a BWP in a dormant state.

In the embodiment of this application, the network side device may activate the target communication resource of the terminal through activation signaling. For example, the target communication resource of the terminal is activated through a MAC CE command or a DCI command.

In the embodiment of this application, the secondary cell of the terminal may be a secondary carrier of the terminal.

S212. The network side device performs uplink beam scanning on the target communication resource while activating the target communication resource.

In the embodiment of this application, the network side device performs uplink beam scanning on the target communication resource while activating the target communication resource. For example, the network side device may start uplink beam scanning after sending the activation signaling to activate the target communication resource and before receiving acknowledgment signaling for the activation signaling from the terminal.

According to the technical solution provided in the embodiment of this application, the network side device activates the target communication resource of the terminal, and performs uplink beam scanning on the target communication resource while activating the target communication resource, where the target communication resource includes: a secondary cell or a BWP in a dormant state. Therefore, activation and beam scanning time of the target communication resource can be shortened, time from activation to normal communication of the target communication resource can be shortened, and activation efficiency of the target communication resource can be improved.

Figures 3, 4:
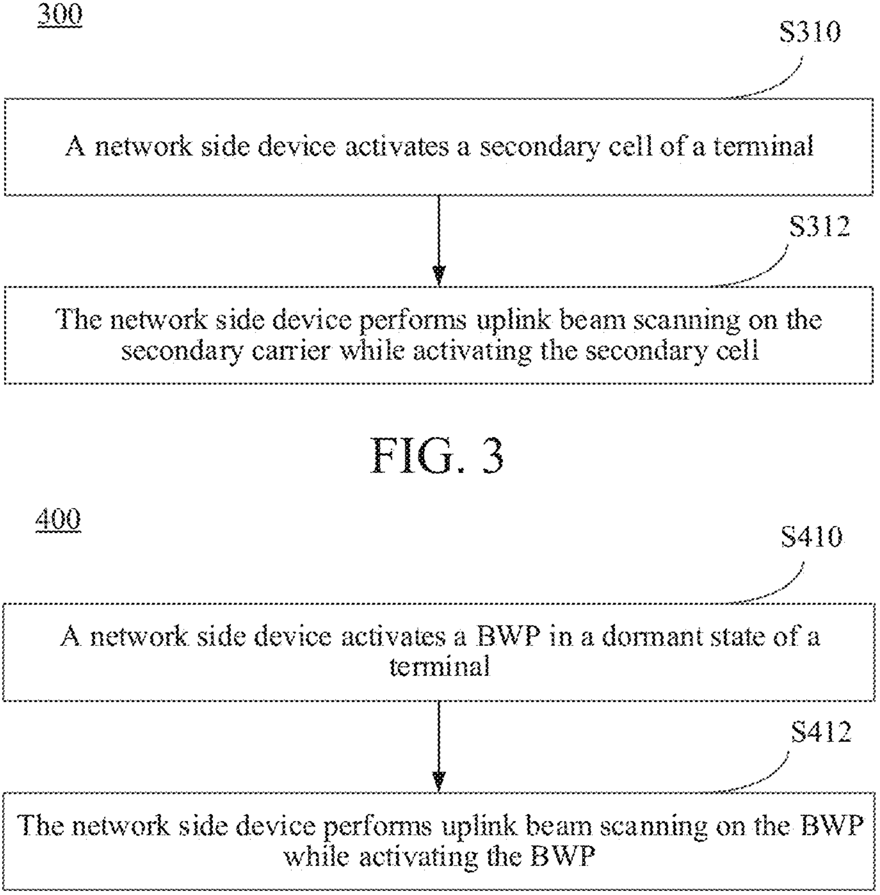
FIG. 3 is a flowchart of another communication resource activation method according to an embodiment of this application.
FIG. 4 is a flowchart of another communication resource activation method according to an embodiment of this application.

FIG. 3 is another schematic flowchart of a communication resource activation method according to an embodiment of this application. The method 300 may be performed by a network side device. In other words, the method may be performed by software or hardware installed on the network side device. In the method 300, a communication resource is a secondary cell of UE. As shown in FIG. 3, the method may include the following steps.

S310. A network side device activates a secondary cell of a terminal.

S312. The network side device performs uplink beam scanning on the secondary cell while activating the secondary cell.

In a possible implementation, the network side device may activate the secondary cell through MAC CE signaling.

In the related art, after the secondary cell is activated, the network side device configures a periodic SRS, a semi-persistent SRS, or an aperiodic SRS on the secondary cell, and controls a specific SRS sending behavior of the terminal by configuring some parameters. A related parameter of the semi-persistent SRS is configured by high-layer signaling (e.g. radio resource control (RRC) signaling). After a specified time after the MAC CE signaling activates the secondary cell, the terminal can start sending the semi-persistent SRS according to a related parameter of an SRS configured by the RRC until the terminal receives a deactivation command from a base station. A related parameter of the aperiodic SRS is configured by the RRC, and triggers the terminal to send a single SRS in downlink control information (DCI). An RRC configuration parameter includes a time domain parameter such as an SRS resource symbol position, occupied symbol number, frequency hopping, repetition parameter R, and the like. Therefore, in the related art, time from activation of the secondary cell by the network side device to reception of the SRS is long.

Therefore, in the foregoing possible implementation, optionally, the MAC CE signaling that activates the secondary cell is further used for triggering the terminal to send a target SRS on the secondary cell. Through the optional implementation, the terminal can be triggered to send the target SRS on the secondary cell while the secondary cell is activated, which shortens the time from activation of the secondary cell by the network side device to reception of the target SRS, thereby enabling the network side device to scan an uplink beam faster and shortening time from activation of the secondary cell to actual use of the secondary cell.

In a possible implementation, the network side device may pre-configure N candidate states of the SRS, each of the candidate states corresponds to at least one configuration parameter of the target SRS, and the MAC CE signaling may trigger one target state in the N candidate states of the target SRS while activating the secondary cell. For example, if there is a 2-bit indication domain in the MAC CE signaling for indicating a state of a triggered target SRS, the target SRS may include four candidate state values, i.e. 00, 01, 10, and 11, and these four candidate states may respectively correspond to different configuration parameters of the target SRS in pre-configuration. For example, 00 represents that an offset value of an SRS resource 1 is x, 01 represents that the offset value of the SRS resource 1 is y, 10 represents repeated sending, and the like. Certainly, it is not limited thereto. In an actual application, one candidate state may also correspond to a plurality of configuration parameters (i.e. a set of configuration parameters) of the target SRS. This is not limited in the embodiments of this application.

In the foregoing possible implementation, after receiving the MAC CE command, the terminal activates the secondary cell, and sends the target SRS while completing activation of the secondary cell. The target SRS may be a periodic SRS, an aperiodic SRS, or a semi-persistent SRS. For example, the secondary cell is actually activated at 3 ms after the terminal receives the MAC CE signaling for activating the secondary cell and feeds back a corresponding acknowledgment signaling (ACK) to a network, and the terminal sends the target SRS according to an SRS trigger state indicated in the MAC CE signaling while the secondary cell is actually activated.

In another possible implementation, the MAC CE signaling may carry a time offset value for the terminal to send the target SRS. The time offset value is an additional time offset value on the basis of a predetermined delay (which may be a delay specified in a protocol, such as 3 ms) after ACK corresponding to the MAC CE signaling that activates the secondary cell is sent, and the time offset value may be the same or different for a plurality of secondary cells. After receiving the MAC CE command, the terminal sends the target SRS when the predetermined delay after feeding back the ACK and the time offset value are reached. Optionally, the time offset value may be pre-configured by the high-layer signaling instead of being carried in the MAC CE signaling.

In an actual application, there may be more than one SRS resource in an SRS set, and each SRS resource is configured on different time domain resources, for example, different symbols. Therefore, in a possible implementation, the MAC CE signaling for activating the secondary cell may also indicate whether it is repeated, i.e. the MAC CE signaling carries indication information indicating whether the target SRS is repeated, for example, repetition ON or OFF. In a case that the repetition is ON, that is, in a case that it is indicated that the target SRS is repeated, the terminal may send the target SRS by using a same sending beam on each SRS resource in an SRS set. In a case that the repetition is OFF, that is, in a case that the indication information indicates that the target SRS is not repeated, the terminal sends the target SRS by using different sending beams on each SRS resource in an SRS set.

In a possible implementation, for the semi-persistent SRS or the periodic SRS, a time window length may be indicated in the MAC CE signaling for activating the secondary cell, that is, the MAC CE signaling carries indication information indicating the time window length, and the indication information indicates the terminal to send the target SRS within a time window corresponding to the time window length, where the target SRS is the periodic SRS or the semi-persistent SRS. In this possible implementation, after the secondary cell is activated, the terminal sends the target SRS within a time window corresponding to the time window length and does not send the target SRS outside the time window. In addition, in an actual application, the time window length may be predefined or pre-agreed instead of being indicated in the MAC CE signaling. This is not limited in the embodiments of this application.

In a possible implementation, the MAC CE signaling carries indication information indicating a transmit power offset of the target SRS. In an actual application, the network side device may individually indicate the transmit power offset for each secondary cell, or the network side device may also determine the transmit power offset according to an average power gain difference of a carrier frequency of each secondary cell. This is not limited in the embodiments of this application.

In a possible implementation, the network side device may also activate the secondary cell through the MAC CE signaling, and in addition, trigger a target SRS on the secondary cell by using DCI signaling. The target SRS is sent aperiodically or semi-persistently. Therefore, in this possible implementation, after the secondary cell is activated through the MAC CE signaling, the method may further include: triggering, by the network side device, the terminal to send the target SRS on the secondary cell through the DCI signaling.

For example, the network side device may send the DCI signaling before receiving acknowledgment signaling (ACK) corresponding to the MAC CE signaling; or the network side device may also send the DCI signaling before a predetermined delay (e.g. 3 ms) after the acknowledgment signaling is received is reached. Therefore, the terminal can be triggered in advance to send an aperiodic SRS or a semi-persistent SRS on the secondary cell.

In an actual application, there may be more than one SRS resource in an SRS set, and each SRS resource is configured on different time domain resources, for example, different symbols. Therefore, in the foregoing possible implementation, optionally, the DCI signaling may carry indication information indicating whether the target SRS is repeated, for example, repetition ON or OFF. In a case that the repetition is ON, that is, in a case that it is indicated that the target SRS is repeated, the terminal may send the target SRS by using a same sending beam on each SRS resource in an SRS set. In a case that the repetition is OFF, that is, in a case that the indication information indicates that the target SRS is not repeated, the terminal sends the target SRS by using different sending beams on each SRS resource in an SRS set.

In the foregoing possible implementation, optionally, the DCI signaling may further carry a time offset value for the terminal to send the target SRS, where the time offset value is an additional time offset value on the basis of a predetermined delay (which may be a delay specified in a protocol, such as 3 ms) after ACK corresponding to the MAC CE signaling that activates the secondary cell is sent, and the time offset value may be the same or different for a plurality of secondary cells. After receiving the DCI command, the terminal sends the target SRS when the predetermined delay after feeding back the ACK and the time offset value are reached. Optionally, the time offset value may be pre-configured by the high-layer signaling instead of being carried in the DCI signaling.

In the foregoing possible implementation, optionally, the DCI signaling carries indication information indicating a time window length, and the indication information instructs the terminal to send the target SRS within a time window corresponding to the time window length. In this possible implementation, after the secondary cell is activated, the terminal sends the target SRS within a time window corresponding to the time window length and does not send the target SRS outside the time window. In addition, in an actual application, the time window length may be predefined or pre-agreed instead of being indicated in the DCI signaling. This is not limited in the embodiments of this application.

In the foregoing possible implementation, optionally, the DCI signaling carries indication information indicating a transmit power of the target SRS. The network side device may determine a transmit power of a target SRS sent on an activated secondary cell with reference to a path loss reference signal. The path loss reference signal may be a reference signal on another activated carrier.

In a possible implementation, the network side device activates the secondary cell through RRC signaling, where the RRC signaling is used for configuring the secondary cell. That is, in this possible implementation, the network side device may activate a secondary cell (SCell) while configuring the secondary cell by using the RRC signaling, and there is no need for additional MAC CE signaling to activate the secondary cell, thereby shortening time for activating the secondary cell.

In the foregoing possible method, in a case that the secondary cell is activated through the RRC signaling, optionally, UE may be triggered to send the target SRS by using the MAC CE signaling or DCI signaling. A specific method may be referred to the relevant descriptions above, and details are not repeated herein again.

FIG. 4 is another schematic flowchart of a communication resource activation method according to an embodiment of this application. The method 400 may be performed by a network side device. In other words, the method may be performed by software or hardware installed on the network side device. In the method 400, a communication resource is a BWP in a dormant state of UE. As shown in FIG. 4, the method may include the following steps.

S410. A network side device activates a BWP in a dormant state of a terminal.

S412. The network side device performs uplink beam scanning on the BWP while activating the BWP.

In a possible implementation, the network side device activates the BWP in the dormant state through DCI signaling. For example, an active identifier of the BWP in the dormant state may be carried in the DCI signaling.

In a possible implementation, the DCI signaling is further used for triggering the terminal to send a target SRS on the BWP, where the target SRS is an aperiodic SRS or a semi-persistent SRS. Through the possible implementation, the terminal may be triggered to send the target SRS on the BWP while the BWP is activated.

In an actual application, there may be more than one SRS resource in an SRS set, and each SRS resource is configured on different time domain resources, for example, different symbols. Therefore, in the foregoing possible implementation, optionally, the DCI signaling may carry indication information indicating whether the target SRS is repeated, for example, repetition ON or OFF. In a case that the repetition is ON, that is, in a case that it is indicated that the target SRS is repeated, the terminal may send the target SRS by using a same sending beam on each SRS resource in an SRS set. In a case that the repetition is OFF, that is, in a case that the indication information indicates that the target SRS is not repeated, the terminal sends the target SRS by using different sending beams on each SRS resource in an SRS set.

In the foregoing possible implementation, optionally, the DCI signaling may further carry a time offset value for the terminal to send the target SRS. The time offset value is an additional time offset value on the basis of a predetermined delay (which may be a delay specified in a protocol, such as 3 ms) after ACK corresponding to the DCI signaling activated by the BWP is sent, and the time offset value may be the same or different for a plurality of BWPs. After receiving the DCI command, the terminal sends the target SRS when the predetermined delay after feeding back the ACK and the time offset value are reached. Optionally, the time offset value may be pre-configured by the high-layer signaling instead of being carried in the DCI signaling.

In the foregoing possible implementation, optionally, the DCI signaling carries indication information indicating a time window length, and the indication information instructs the terminal to send the target SRS within a time window corresponding to the time window length. In this possible implementation, after the BWP is activated, the terminal sends the target SRS within a time window corresponding to the time window length and does not send the target SRS outside the time window. In addition, in an actual application, the time window length may be predefined or pre-agreed instead of being indicated in the MAC CE signaling. This is not limited in the embodiments of this application.

In the foregoing possible implementation, optionally, the DCI signaling carries indication information indicating a transmit power of the target SRS. The network side device may determine a transmit power of a target SRS sent on an activated BWP with reference to a path loss reference signal. The path loss reference signal may be a reference signal on another activated BWP.

Through the foregoing embodiment, time from activation to actual use of the BWP can be shortened, and when the BWP is activated, the UE may be triggered to send the target SRS, which shortens time from activation of the BWP to scanning the uplink beam by the BWP.

Figure 5:
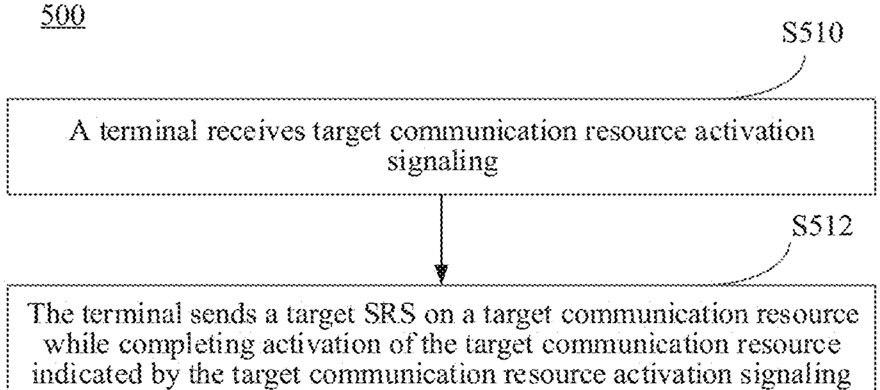
FIG. 5 is a flowchart of an SRS sending method according to an embodiment of this application.

FIG. 5 is another schematic flowchart of an SRS sending method according to an embodiment of this application. The method 500 may be performed by a terminal. In other words, the method may be performed by software or hardware installed on the terminal. As shown in FIG. 5, the method may include the following steps.

S510. A terminal receives target communication resource activation signaling.

The target communication resource activation signaling is activation signaling for activating a target communication resource sent by a network side device. The implementation may be referred to related descriptions in methods 200 to 400, and details are not repeated herein.

S512. The terminal sends a target SRS on a target communication resource while completing activation of the target communication resource indicated by the target communication resource activation signaling, where the target communication resource includes a secondary cell or a BWP in a dormant state of the terminal.

As described in the foregoing method 300, if the target communication resource is the secondary cell of the terminal, the target communication resource activation signaling may include: MAC CE signaling used for activating the secondary cell of the terminal.

As described in the foregoing method 300, the terminal may be triggered by the MAC CE signaling to send the target SRS on an activated secondary cell, or the terminal may be triggered by DCI signaling to send the target SRS on an activated secondary cell. The following respectively describes these two cases.

(1) The MAC CE signaling is further used for triggering the terminal to send the target SRS on the activated secondary cell.

In a possible implementation, the MAC CE signaling triggers one state in N states while activating the secondary cell, where the N states are N states pre-configured for the target SRS, each of the states corresponds to at least one configuration parameter of the target SRS, and N is an integer greater than or equal to 1. The terminal may determine a configuration parameter or a set of configuration parameters of the target SRS according to the MAC CE. For example, if there is a 2-bit indication domain in the MAC CE signaling for indicating a state of a triggered target SRS, the target SRS may include four candidate state values, i.e. 00, 01, 10, and 11, and these four candidate states may respectively correspond to different configuration parameters of the target SRS in pre-configuration. For example, 00 represents that an offset value of an SRS resource 1 is x, 01 represents that the offset value of the SRS resource 1 is y, 10 represents repeated sending, and the like. If a value of the indication domain in the received MAC CE is 10, it is indicated that the target SRS is repeatedly sent.

Therefore, in this possible implementation, the sending, by the terminal, a target SRS on a target communication resource while completing activation of the target communication resource indicated by the target communication resource activation signaling includes:

sending, by the terminal, the target SRS on the secondary cell according to a state triggered by a MAC CE command after a predetermined delay after feeding back acknowledgment signaling corresponding to the MAC CE signaling.

In another possible implementation, the sending, by the terminal, a target SRS on a target communication resource while completing activation of the target communication resource indicated by the target communication resource activation signaling may include:

determining, by the terminal, a time offset value for sending the target SRS, where the time offset value is a time offset for a target moment, the target moment is a moment when a predetermined delay after acknowledgment signaling corresponding to the MAC CE signaling is fed back is reached, and the time offset value is indicated by the MAC CE signaling or configured by a network side device through high-layer signaling; and sending, by the terminal, the target SRS at a moment indicated by the time offset value.

In an actual application, there may be more than one SRS resource in an SRS set, and each SRS resource is configured on different time domain resources, for example, different symbols. Therefore, the sending the target SRS may include: sending, by the terminal, the target SRS on each SRS resource by using a same sending beam if the MAC CE signaling indicates that the target SRS is repeated; or sending, by the terminal, the target SRS on different SRS resources by using different sending beams if the MAC CE signaling indicates that the target SRS is not repeated. For example, in a case that the indication information indicates that the target SRS is repeated, the terminal may send the target SRS by using a same sending beam on each SRS resource in an SRS set. In a case that the indication information indicates that the target SRS is not repeated, the terminal sends the target SRS by using different sending beams on each SRS resource in an SRS set.

In a possible implementation, the sending the target SRS may include: sending, by the terminal, the target SRS within a time window corresponding to a time window length, where the time window length is indicated or predefined by the MAC CE signaling. That is, in this possible implementation, after the secondary cell is activated, the terminal sends the target SRS within a time window corresponding to the time window length and does not send the target SRS outside the time window. A starting point of the time window may be a sending moment of feedback of the acknowledgment signaling (ACK) of the MAC CE, or a moment of a predetermined delay after the feedback of the acknowledgment signaling (ACK) of the MAC CE. This is not limited in the embodiment of this application.

In a possible implementation, the sending the target SRS includes: sending, by the terminal, the target SRS according to a transmit power offset indicated by the MAC CE signaling. In an actual application, the network side device may individually indicate the transmit power offset for each secondary cell, or the network side device may also determine the transmit power offset according to an average power gain difference of a carrier frequency of each secondary cell. This is not limited in the embodiments of this application.

(2) The terminal is triggered to send the target SRS on the activated secondary cell through DCI signaling.

In this implementation, the sending, by the terminal, a target SRS on a target communication resource while completing activation of the target communication resource indicated by the target communication resource activation signaling includes:

receiving DCI signaling, where the DCI signaling is used for triggering the terminal to send the target SRS on the secondary cell, the target SRS is an aperiodic SRS or a semi-persistent SRS, and the DCI signaling is sent by a network side device before the network side device receives acknowledgment signaling corresponding to the MAC CE signaling, or the DCI signaling is sent by the network side device before a predetermined delay after the network side device receives the acknowledgment signaling is reached; and sending the target SRS according to the DCI signaling.

In an actual application, there may be more than one SRS resource in an SRS set, and each SRS resource is configured on different time domain resources, for example, different symbols. Therefore, in a possible implementation, the sending the target SRS may include: sending, by the terminal, the target SRS on each SRS resource by using a same sending beam if the DCI signaling indicates that the target SRS is repeated; or sending, by the terminal, the target SRS on different SRS resources by using different sending beams if the DCI signaling indicates that the target SRS is not repeated. That is, in the possible implementation, the DCI signaling may carry indication information indicating whether the target SRS is repeated, for example, repetition ON or OFF. In a case that the repetition is ON, that is, in a case that it is indicated that the target SRS is repeated, the terminal may send the target SRS by using a same sending beam on each SRS resource in an SRS set. In a case that the repetition is OFF, that is, in a case that the indication information indicates that the target SRS is not repeated, the terminal sends the target SRS by using different sending beams on each SRS resource in an SRS set.

In a possible implementation, the sending, by the terminal, a target SRS on a target communication resource while completing activation of the target communication resource indicated by the target communication resource activation signaling includes: determining, by the terminal, a time offset value for sending the target SRS, where the time offset value is a time offset for a target moment, the target moment is a predetermined delay after acknowledgment signaling corresponding to the target communication resource signaling is fed back, and the time offset value is indicated by the DCI signaling or configured by a network side device through high-layer signaling; and sending, by the terminal, the target SRS at a moment indicated by the time offset value. The time offset value is an additional time offset value on the basis of a predetermined delay (which may be a delay specified in a protocol, such as 3 ms) after ACK corresponding to the MAC CE signaling that activates the secondary cell is sent, and the time offset value may be the same or different for a plurality of secondary cells. After receiving the DCI command, the terminal sends the target SRS when the predetermined delay after feeding back the ACK and the time offset value are reached.

In a possible implementation, the sending the target SRS includes: sending, by the terminal, the target SRS within a time window corresponding to a time window length, where the time window length is indicated or predefined by the DCI signaling. In this possible implementation, after the secondary cell is activated, the terminal sends the target SRS within a time window corresponding to the time window length and does not send the target SRS outside the time window.

In a possible implementation, optionally, the DCI signaling carries indication information indicating a transmit power of the target SRS. Therefore, the sending the target SRS may include: sending, by the terminal, the target SRS according to a transmit power indicated by the DCI signaling.

If the target communication resource is a BWP in a dormant state, in a possible implementation, the target communication resource activation signaling includes: DCI signaling used for activating the BWP in the dormant state.

In a possible implementation, the DCI signaling is further used for triggering the terminal to send the target SRS on the BWP.

In an actual application, when the terminal sends the target SRS, the terminal may send the target SRS by using a corresponding implementation in which the UE is triggered to send the target SRS on the activated secondary cell through DCI signaling. Details are referred to the related description that the UE is triggered to send the target SRS on the activated secondary cell through DCI signaling, and are not repeated herein.

It needs to be noted that, the communication resource activation method provided in the embodiments of this application may be performed by a communication resource activation apparatus or a control module included in the communication resource activation apparatus and configured to perform the communication resource activation method. In the embodiments of this application, the communication resource activation apparatus provided in the embodiments of this application is described by using an example in which the communication resource activation method is performed by the communication resource activation apparatus.

Figure 6:
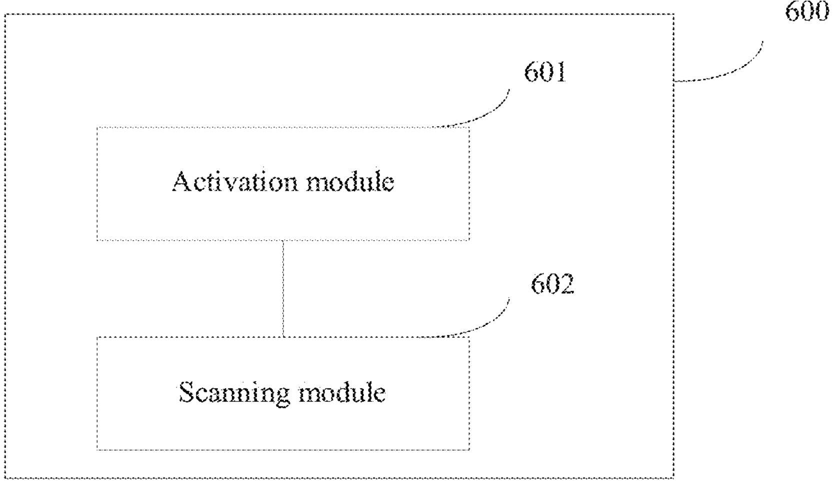
FIG. 6 is a schematic structural diagram of a communication resource activation apparatus according to an embodiment of this application.

FIG. 6 is a schematic structural diagram of a communication resource activation apparatus according to an embodiment of this application. As shown in FIG. 6, the apparatus 600 mainly includes: an activation module 601 and a scanning module 602.

In the embodiment of this application, the activation module 601 is configured to activate a target communication resource of a terminal, where the target communication resource includes: a secondary cell or a BWP in a dormant state; and the scanning module 602 is configured to perform uplink beam scanning on the target communication resource while the activation module activates the target communication resource.

In a possible implementation, the activating, by an activation module 601, a secondary cell of a terminal includes: activating the secondary cell through MAC CE signaling.

In a possible implementation, the MAC CE signaling is further used for triggering the terminal to send a target SRS on the secondary cell.

In a possible implementation, the MAC CE signaling triggers one target state in N candidate states while activating the secondary cell, where the N candidate states are N states pre-configured for the target SRS, each of the candidate states corresponds to at least one configuration parameter of the target SRS, and N is an integer greater than or equal to 1.

In a possible implementation, the MAC CE signaling carries a time offset value for the terminal to send the target SRS.

In a possible implementation, indication information indicating whether the target SRS is repeated is carried in the MAC CE signaling.

In a possible implementation, the MAC CE signaling carries indication information indicating a time window length, and instructing the terminal to send the target SRS within a time window corresponding to the time window length, where the target SRS is a periodic SRS or a semi-persistent SRS.

In a possible implementation, the MAC CE signaling carries indication information indicating a transmit power offset of the target SRS.

In a possible implementation, the activation module 601 is further configured to trigger the terminal to send a target SRS on the secondary cell through DCI signaling after activating the secondary cell through the MAC CE signaling, where the target SRS is an aperiodic SRS or a semi-persistent SRS.

In a possible implementation, the triggering, by the activation module 601, the terminal to send a target SRS on the secondary cell through DCI signaling includes:

sending the DCI signaling before receiving acknowledgment signaling corresponding to the MAC CE signaling; or, sending the DCI signaling before a predetermined delay after receiving the acknowledgment signaling is reached.

In a possible implementation, the activating, by the activation module 601, a BWP of a terminal in a dormant state includes: activating the BWP in the dormant state through DCI signaling.

In a possible implementation, the DCI signaling is further used for triggering the terminal to send a target SRS on the BWP, where the target SRS is an aperiodic SRS or a semi-persistent SRS.

In a possible implementation, indication information indicating whether the target SRS is repeated is carried in the DCI signaling.

In a possible implementation, the DCI signaling carries a time offset value for the terminal to send the target SRS.

In a possible implementation, the DCI signaling carries indication information indicating a time window length, and the indication information instructs the terminal to send the target SRS within a time window corresponding to the time window length.

In a possible implementation, the DCI signaling carries indication information indicating a transmit power of the target SRS.

In a possible implementation, the activating, by the activation module, a secondary cell of a terminal includes: activating the secondary cell through RRC signaling, where the RRC signaling is used for configuring the secondary cell.

Figure 7:
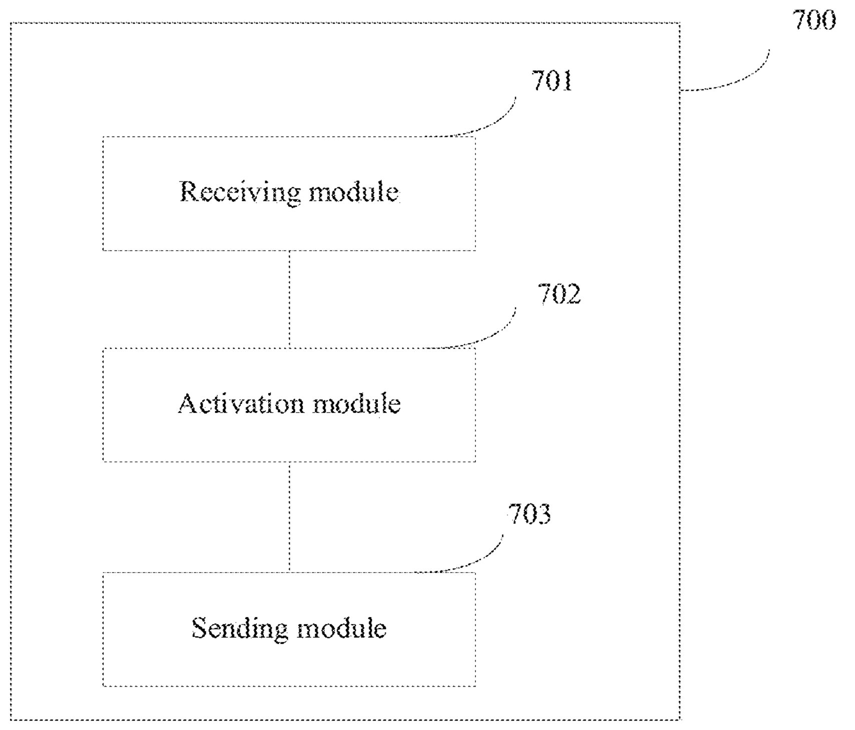
FIG. 7 is a schematic structural diagram of an SRS sending apparatus according to an embodiment of this application.

FIG. 7 is a schematic structural diagram of an SRS sending apparatus according to an embodiment of this application. As shown in FIG. 7, the apparatus 700 mainly includes: a receiving module 701, an activation module 702, and a sending module 703.

In the embodiment of this application, the receiving module 701 is configured to receive target communication resource activation signaling; the activation module 702 is configured to activate a target communication resource indicated by the target communication resource activation signaling based on the target communication resource activation signaling; and the sending module 703 is configured to send a target SRS on the target communication resource while the activation module 702 completes activation of the target communication resource, where the target communication resource includes a secondary cell or a BWP in a dormant state of the terminal.

In a possible implementation, the target communication resource activation signaling includes: MAC CE signaling used for activating the secondary cell of the terminal.

In a possible implementation, the MAC CE signaling is further used for triggering the terminal to send the target SRS on the secondary cell.

In a possible implementation, the MAC CE signaling triggers one state in N states while activating the secondary cell, where the N states are N states pre-configured for the target SRS, each of the states corresponds to at least one configuration parameter of the target SRS, and N is an integer greater than or equal to 1.

In a possible implementation, the sending, by a sending module 703, a target SRS on the target communication resource includes:

sending the target SRS on the secondary cell according to a state triggered by a MAC CE command after a predetermined delay after feeding back acknowledgment signaling corresponding to the MAC CE signaling.

In a possible implementation, the sending, by a sending module 703, a target SRS on the target communication resource includes:

determining a time offset value for sending the target SRS, where the time offset value is a time offset for a target moment, the target moment is a moment when a predetermined delay after acknowledgment signaling corresponding to the MAC CE signaling is fed back is reached, and the time offset value is indicated by the MAC CE signaling or configured by a network side device through high-layer signaling; and sending the target SRS at a moment indicated by the time offset value.

In a possible implementation, the sending, by a sending module 703, a target SRS includes:

sending the target SRS on each SRS resource by using a same sending beam if the MAC CE signaling indicates that the target SRS is repeated; or, sending the target SRS on different SRS resources by using different sending beams if the MAC CE signaling indicates that the target SRS is not repeated.

In a possible implementation, the sending, by a sending module 703, a target SRS includes: sending, by the terminal, the target SRS according to a transmit power offset indicated by the MAC CE signaling.

In a possible implementation, the receiving module 701 is further configured to receive DCI signaling, where the DCI signaling is used for triggering the terminal to send the target SRS on the secondary cell, the target SRS is an aperiodic SRS or a semi-persistent SRS, and the DCI signaling is sent by a network side device before the network side device receives acknowledgment signaling corresponding to the MAC CE signaling, or the DCI signaling is sent by the network side device before a predetermined delay after the network side device receives the acknowledgment signaling is reached; and the sending, by a sending module 703, a target SRS on the target communication resource includes: sending the target SRS according to the DCI signaling.

In a possible implementation, the target communication resource activation signaling includes: DCI signaling used for activating the BWP in the dormant state.

In a possible implementation, the DCI signaling is further used for triggering the terminal to send the target SRS on the BWP.

In a possible implementation, the sending, by a sending module 703, a target SRS on the target communication resource includes:

determining a time offset value for sending the target SRS, where the time offset value is a time offset for a target moment, the target moment is a moment when a predetermined delay after acknowledgment signaling corresponding to the target communication resource signaling is fed back is reached, and the time offset value is indicated by the DCI signaling or configured by a network side device through high-layer signaling; and sending the target SRS at a moment indicated by the time offset value.

In a possible implementation, the sending, by a sending module 703, a target SRS includes:

sending the target SRS on each SRS resource by using a same sending beam if the DCI signaling indicates that the target SRS is repeated; or, sending the target SRS on different SRS resources by using different sending beams if the DCI signaling indicates that the target SRS is not repeated.

In a possible implementation, the sending, by a sending module 703, a target SRS includes:

sending the target SRS within a time window corresponding to a time window length, where the time window length is indicated or predefined by the DCI signaling.

In a possible implementation, the sending, by a sending module 703, a target SRS includes: sending the target SRS according to a transmit power indicated by the DCI signaling.

The SRS sending apparatus in the embodiment of this application may be an apparatus, or a component, an integrated circuit, or a chip in a terminal. The apparatus may be a mobile terminal or a non-mobile terminal. Exemplarily, the mobile terminal may include, but is not limited to, types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The SRS sending apparatus in the embodiment of this application may be an apparatus with an operating system. The operating system may be an Android (Android) operating system, or may be an ios operating system or other possible operating systems, which is not specifically limited in the embodiments of this application.

The SRS sending apparatus provided in the embodiments of this application can implement each process implemented by the terminal in the method embodiments of FIG. 2 to FIG. 6 and achieve the same technical effect. To avoid repetition, details are not described herein again.

Figure 8:
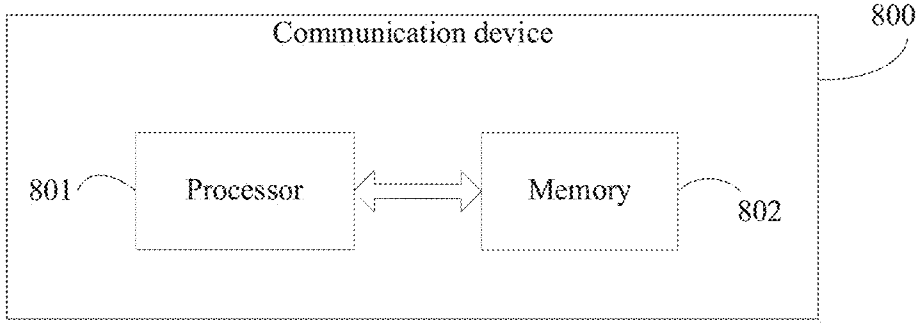
FIG. 8 is a schematic structural diagram of a communication device according to an embodiment of this application.

Optionally, as shown in FIG. 8, the embodiments of this application further provide a communication device 800, including a processor 801, a memory 802, and a program or an instruction stored in the memory 802 and executable on the processor 801. For example, when the communication device 800 is a terminal, the program or the instruction is executed by the processor 801 to implement processes of the foregoing embodiments of the SRS sending method, and the same technical effect can be achieved. When the communication device 800 is a network side device, the program or the instruction is executed by the processor 801 to implement processes of the foregoing embodiments of the communication resource activation method, and the same technical effect can be achieved. To avoid repetition, details are not described herein again.

Figure 9:
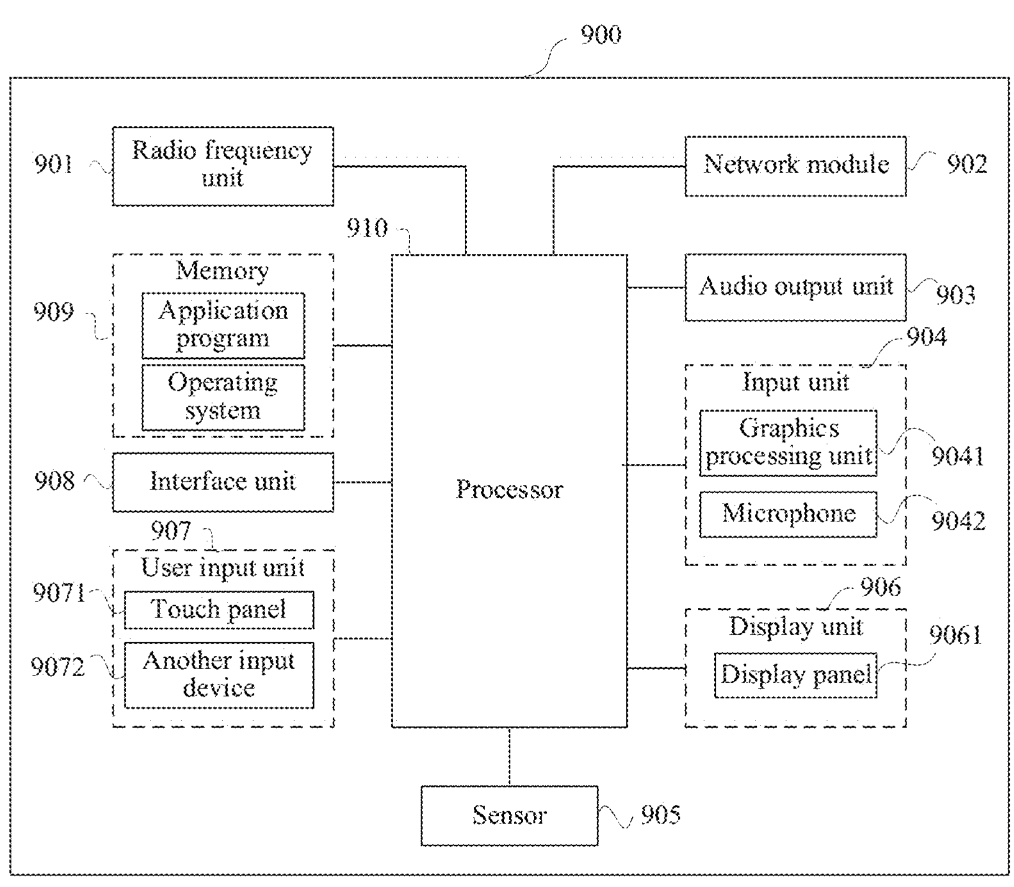
FIG. 9 is a schematic structural diagram of hardware of a terminal according to an embodiment of this application.

FIG. 9 is a schematic structural diagram of hardware of a terminal implementing an embodiment of this application.

The terminal 900 includes, but is not limited to: components such as a radio frequency unit 901, a network module 902, an audio output unit 903, an input unit 904, a sensor 905, a display unit 906, a user input unit 907, an interface unit 908, a memory 909, and a processor 910.

Those skilled in the art may understand that the terminal 900 may further include a power supply (such as a battery) for supplying power to the components. The power supply may be logically connected to the processor 910 by using a power supply management system, thereby implementing functions such as charging, discharging, and power consumption management, by using the power supply management system. A terminal structure shown in FIG. 9 does not constitute a limitation to the terminal, and the terminal may include more or fewer components than those shown in the figure, or some components may be combined, or a different component deployment may be used. Details are not described herein again.

It should be understood that in the embodiments of this application, the input unit 904 may include a graphics processing unit (GPU) 9041 and a microphone 9042, and the graphics processing unit 9041 processes image data of a still picture or a video obtained by an image capture apparatus (such as a camera) in a video capture mode or an image capture mode. The display unit 906 may include a display panel 9061. The display panel 9061 may be configured by using a liquid crystal display, an organic light-emitting diode, or the like. The user input unit 907 includes a touch panel 9071 and another input device 9072. The touch panel 9071 is also referred to as a touch screen. The touch panel 9071 may include two parts: a touch detection apparatus and a touch controller. The another input device 9072 may include, but is not limited to, a physical keyboard, a functional key (for example, a volume control key or a switch key), a track ball, a mouse, and a joystick, and the details will not be described herein again.

In the embodiments of this application, the radio frequency unit 901 is configured to receive downlink data from a network side device and transmit the downlink data to the processor 910 for processing; and send uplink data to the network side device. Generally, the radio frequency unit 901 includes, but is not limited to, an antenna, at least one amplifier, a transceiver, a coupler, a low noise amplifier, a duplexer, and the like.

The memory 909 may be configured to store a software program or instruction and various data. The memory 909 may mainly include a program or instruction storage area and a data storage area. The program or instruction storage area may store an operating system, an application program or instruction required by at least one function (for example, a sound playback function and an image display function), and the like. In addition, the memory 909 may include a high-speed random access memory and may also include a non-volatile memory. The non-volatile memory may be a read-only memory (ROM), a programmable read-only memory PROM), an erasable programmable read-only memory (EPROM), an electrically erasable programmable read-only memory (EEPROM), or a flash memory. The memory 909 may include, for example, at least one magnetic disk memory device, a flash memory device, or other non-volatile solid-state memory devices.

The processor 910 may include one or more processing units. Optionally, the processor 910 may integrate an application processor and a modem processor, where the application processor mainly processes an operating system, a user interface, an application program or an instruction, and the like, and the modem processor mainly processes wireless communication, such as a baseband processor. It may be understood that the modem processor may alternatively not be integrated into the processor 910.

The radio frequency unit 901 is configured to receive target communication resource activation signaling;

the processor 910 is configured to activate a target communication resource indicated by the target communication resource activation signaling based on the target communication resource activation signaling; and the radio frequency unit 901 is further configured to send a target SRS on the target communication resource while the activation module completes activation of the target communication resource, where the target communication resource includes a secondary cell or a BWP in a dormant state of the terminal.

The terminal 900 provided in the embodiments of this application can implement each process implemented by the terminal in the method 200 to 500 and achieve the same technical effect. To avoid repetition, details are not described herein again.

Figure 10:
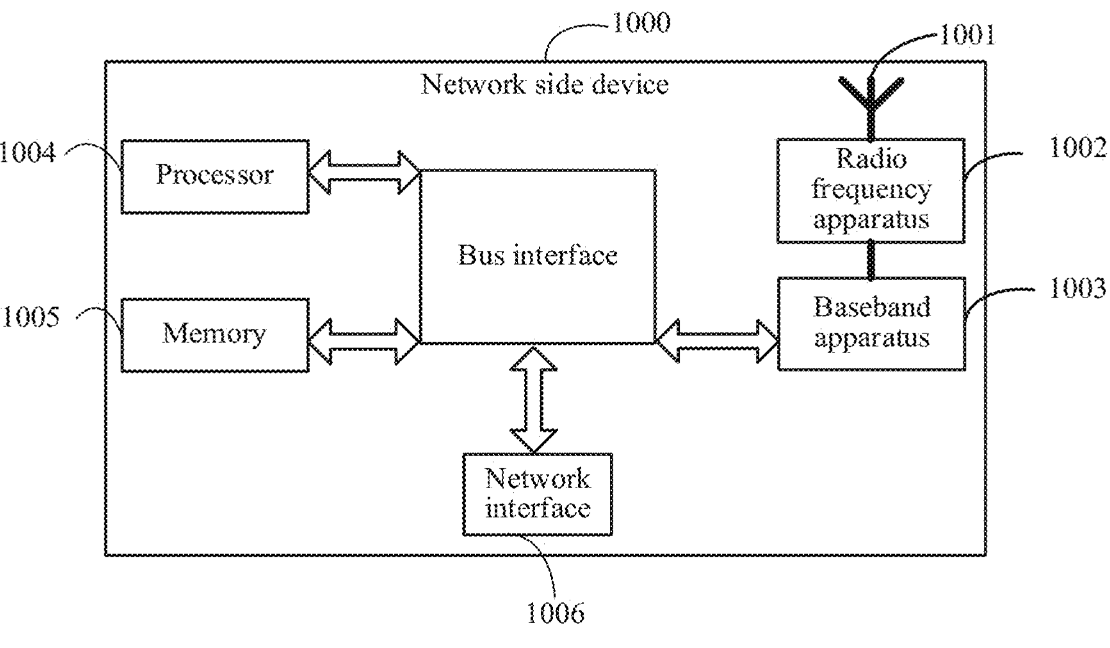
FIG. 10 is a schematic structural diagram of hardware of a network side device according to an embodiment of this application.

The embodiments of this application further provide a network side device. As shown in FIG. 10, the network side device 1000 includes: an antenna 1001, a radio frequency apparatus 1002, and a baseband apparatus 1003. The antenna 1001 is connected to the radio frequency apparatus 1002. In an uplink direction, the radio frequency apparatus 1002 receives information through the antenna 1001, and sends the received information to the baseband apparatus 1003 for processing. In a downlink direction, the baseband apparatus 1003 processes to-be-sent information, and sends the information to the radio frequency apparatus 1002. The radio frequency apparatus 1002 processes the received information and sends the information through the antenna 1001.

The frequency band processing apparatus may be located in the baseband apparatus 1003. The method performed by the network side device in the foregoing embodiments may be implemented in the baseband apparatus 1003, and the baseband apparatus 1003 includes a processor 1004 and a memory 1005.

The baseband apparatus 1003 may include, for example, at least one baseband plate. A plurality of chips are disposed on the baseband plate. As shown in FIG. 10, one of the plurality of chips is, for example, the processor 1004, and is connected to the memory 1005, to invoke a program in the memory 1005 to perform operations of the network side device in the foregoing method embodiments.

The baseband apparatus 1003 may further include a network interface 1006, configured to exchange information with the radio frequency apparatus 1002. The interface is, for example, a common public radio interface (CPRI).

In some embodiments, the network side device provided in the embodiments of the present application further includes: an instruction or program stored in the memory 1005 and executable on the processor 1004. The processor 1004 invokes the instruction or program in the memory 1005 to perform the method performed by each module shown in FIG. 6 and achieve the same technical effect. To avoid repetition, details are not described herein again.

The embodiments of this application further provide a non-transitory readable storage medium storing a program or an instruction. The program or the instruction is executed by a processor to implement the processes of the embodiments of the foregoing communication resource activation method or the SRS sending method, and the same technical effects can be achieved. To avoid repetition, details are not described herein again.

The processor may be a processor in the terminal or network side device in the foregoing embodiments. The non-transitory readable storage medium includes a non-transitory computer-readable storage medium, for example, a computer read-only memory (ROM), a random access memory (RAM), a magnetic disk, or an optical disc.

The embodiments of this application further provide a chip, including a processor and a communication interface. The communication interface is coupled to the processor, and the processor is configured to run a program or an instruction of a network side device to implement processes of the foregoing embodiments of the communication resource activation method, or the processor is configured to run a program or an instruction of a terminal to implement processes of the foregoing embodiments of the SRS sending method, and the same technical effect can be achieved. To avoid repetition, details are not described herein again.

A computer program product is provided. The computer program product includes a processor, a memory, and a program or an instruction stored in the memory and executable in the processor. The program or the instruction is executed by the processor to implement processes of the embodiments of the foregoing communication resource activation method or the SRS sending method, and the same technical effects can be achieved. To avoid repetition, details are not described herein again.

It should be noted that, the chip mentioned in the embodiments of this application may also be referred to as a system-level chip, a system chip, a chip system, a system on chip, or the like.

It needs to be noted that, terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence "including one" does not exclude that there are still other same elements in the process, method, object, or apparatus. Furthermore, it should be noted that a scope of the methods and apparatus in the embodiments of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and certainly, may also be implemented by hardware, but in many cases, the former manner is a better implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods according to the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A communication resource activation method, comprising:

activating, by a network side device, a target communication resource of a terminal, and performing uplink beam scanning on the target communication resource while activating the target communication resource, wherein the target communication resource comprises a bandwidth part (BWP) in a dormant state;

wherein activating, by the network side device, the BWP of the terminal in the dormant state comprises:

activating, by the network side device, the BWP in the dormant state through downlink control information (DCI) signaling; wherein the DCI signaling is further used for triggering the terminal to send a target sounding reference signal (SRS) on the BWP;

wherein the DCI signaling carries at least one of:

indication information indicating whether the target SRS is repeated;

a time offset value for the terminal to send the target SRS;

indication information indicating a time window length, and instructing the terminal to send the target SRS within a time window corresponding to the time window length; or indication information indicating a transmit power of the target SRS.

2. The method according to claim 1, wherein the target communication resource further comprises a secondary cell;

wherein activating, by the network side device, the secondary cell of the terminal comprises:

activating, by the network side device, the secondary cell through medium access control control element (MAC CE) signaling; or activating, by the network side device, the secondary cell through radio resource control (RRC) signaling, wherein the RRC signaling is used for configuring the secondary cell;

wherein the MAC CE signaling is further used for triggering the terminal to send the target SRS on the secondary cell.

3. The method according to claim 2, wherein the MAC CE signaling triggers one target state in N candidate states while activating the secondary cell, wherein the N candidate states are N states pre-configured for the target SRS, each of the candidate states corresponds to at least one configuration parameter of the target SRS, and N is an integer greater than or equal to 1.

4. The method according to claim 2, wherein the MAC CE signaling carries at least one of:

a time offset value for the terminal to send the target SRS;

indication information indicating whether the target SRS is repeated;

indication information indicating a time window length, and instructing the terminal to send the target SRS within a time window corresponding to the time window length, wherein the target SRS is a periodic SRS or a semi-persistent SRS; or indication information indicating a transmit power offset of the target SRS.

5. The method according to claim 2, wherein after the activating, by the network side device, the secondary cell through MAC CE signaling, the method further comprises:

triggering, by the network side device, the terminal to send the target SRS on the secondary cell through DCI signaling, wherein the target SRS is an aperiodic SRS or a semi-persistent SRS.

6. The method according to claim 5, wherein the triggering, by the network side device, the terminal to send the target SRS on the secondary cell through DCI signaling comprises:

sending, by the network side device, the DCI signaling before receiving acknowledgment signaling corresponding to the MAC CE signaling; or, sending, by the network side device, the DCI signaling before a predetermined delay after receiving the acknowledgment signaling is reached.

7. The method according to claim 1, wherein the target SRS is an aperiodic SRS or a semi-persistent SRS.

8. A network side device, comprising a processor, a memory, and a program or an instruction stored in the memory and executable by the processor, the program or the instruction, when executed by the processor, causing the network side device to implement:

activating a target communication resource of a terminal, and performing uplink beam scanning on the target communication resource while activating the target communication resource, wherein the target communication resource comprises a BWP in a dormant state;

wherein the program or the instruction, when executed by the network side device, causes the network side device to perform:

activating the BWP in the dormant state through downlink control information (DCI) signaling; wherein the DCI signaling is further used for triggering the terminal to send a target sounding reference signal (SRS} on the BWP;

wherein the DCI signaling carries at least one of:

indication information indicating whether the target SRS is repeated;

a time offset value for the terminal to send the target SRS;

indication information indicating a time window length, and instructing the terminal to send the target SRS within a time window corresponding to the time window length; or indication information indicating a transmit power of the target SRS.

9. The network side device according to claim 8, wherein the target communication resource further comprises a secondary cell;

wherein the program or the instruction, when executed by the network side device, causes the network side device further to perform:

activating the secondary cell through medium access control control element (MAC CE) signaling; wherein the MAC CE signaling is further used for triggering the terminal to send a target sounding reference signal (SRS) on the secondary cell.

10. The network side device according to claim 9, wherein the MAC CE signaling triggers one target state in N candidate states while activating the secondary cell, wherein the N candidate states are N states pre-configured for the target SRS, each of the candidate states corresponds to at least one configuration parameter of the target SRS, and N is an integer greater than or equal to 1.

11. The network side device according to claim 9, wherein the MAC CE signaling carries at least one of:

a time offset value for the terminal to send the target SRS;

indication information indicating whether the target SRS is repeated;

indication information indicating a time window length, and instructing the terminal to send the target SRS within a time window corresponding to the time window length, wherein the target SRS is a periodic SRS or a semi-persistent SRS; or indication information indicating a transmit power offset of the target SRS.

12. The network side device according to claim 9, wherein the program or the instruction, when executed by the network side device, causes the network side device to perform: triggering the terminal to send a target SRS on the secondary cell through DCI signaling, wherein the target SRS is an aperiodic SRS or a semi-persistent SRS.

13. The network side device according to claim 12, wherein the program or the instruction, when executed by the network side device, causes the network side device to perform:

sending the DCI signaling before receiving acknowledgment signaling corresponding to the MAC CE signaling; or, sending the DCI signaling before a predetermined delay after receiving the acknowledgment signaling is reached.

* * * * *